H. R. EDGECOMB.
ELECTRODE FOR ARC LAMPS.
APPLICATION FILED DEC. 7, 1916.
1,272,401.
Patented July 16, 1918.
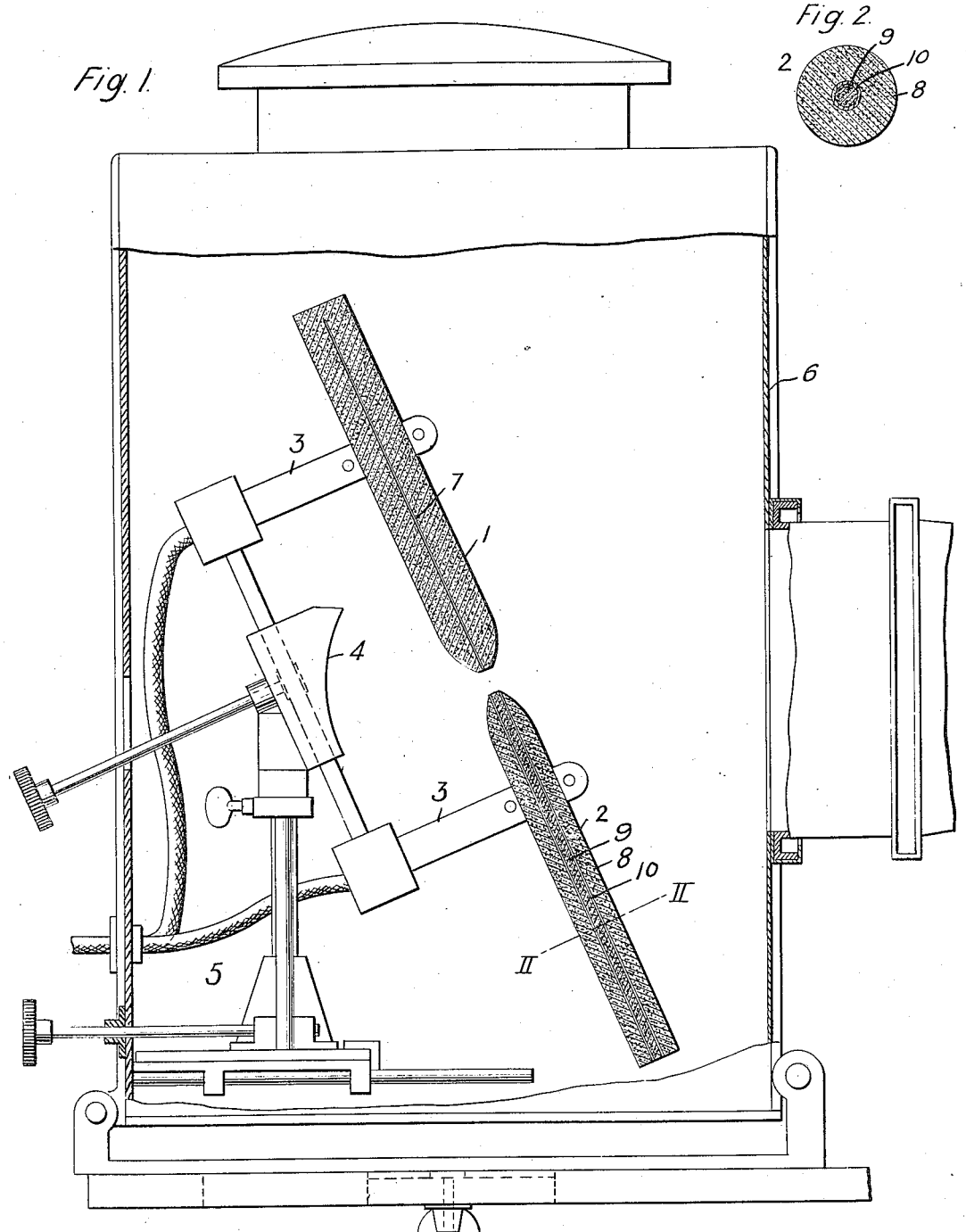
WITNESSES:
Fred H. Miller
M. M. Heubel
INVENTOR
Henry R. Edgecomb
BY
Robson De S. Brown
ATTORNEY

UNITED STATES PATENT OFFICE.

HENRY R. EDGECOMB, OF ST. MARYS, PENNSYLVANIA, ASSIGNOR TO SPEER CARBON COMPANY, A CORPORATION OF PENNSYLVANIA.

ELECTRODE FOR ARC-LAMPS.

1,272,401.  Specification of Letters Patent.  Patented July 16, 1918.

Application filed December 7, 1916. Serial No. 135,613.

*To all whom it may concern:*

Be it known that I, HENRY R. EDGECOMB, a citizen of the United States, and a resident of St. Marys, in the county of Elk and State of Pennsylvania, have invented a new and useful Improvement in Electrodes for Arc-Lamps, of which the following is a specification.

My invention relates to electrodes for arc lamps and it has special relation to electrodes for use in projection apparatus in which the arc must be maintained in accurate focus.

One object of my invention is to provide a cored electrode for use as the negative electrode in a direct current lamp, or as the contributory electrode in an alternating current lamp, which shall be so constructed as to prevent the arc from migrating over the electrode tip, such means consisting of a heat-insulating but electrically conducting film or tubular partition surrounding the central core of the electrode.

Another object of my invention is to provide a positive or luminous electrode adapted for coöperation with the above-described type of negative electrode or with other suitable negative electrodes and having means for providing a localized hot area upon the electrode tip during burning, this result being obtained by constructing the electrode in such a manner that a restricted portion of the electrode tip burns more readily than the body of the electrode and therefore tends to localize and stabilize the arc. Specifically, I obtain this heat-localizing result by providing the electrode with a longitudinal perforation of minute diameter, open at the electrode tip but closed at the opposite end of the electrode.

A still further object of my invention is to provide arc lamp electrodes having their arcing ends formed in the course of manufacture in substantially the shape which the electrodes assume during burning, in order that the arc struck between such electrodes may immediately begin to burn in a normal manner without the usual period of flickering and imperfect illumination which is characteristic of ordinary electrodes at the beginning of their operation.

Arc lamps for projection purposes may be of either the direct current or the alternating current type, and are ordinarily provided with alined carbon electrodes and with suitable feeding mechanism for maintaining the arcing ends of the electrodes a definite distance apart as the electrodes burn away. If the lamp is of the direct current type, the spot of light formed on the tip of the rapidly consuming positive electrode is maintained in focus in the projection system and if the lamp is of the alternating current type, the bright spot in focus may be formed on either electrode, both electrodes being consumed equally. In either case, the upper electrode is usually made the positive or luminous electrode, while the lower electrode is negative or contributory. The arc tends to move unsteadily across the electrode tips, and my present invention is concerned with means for preventing such migrating tendency and for keeping the arc substantially motionless.

An arrangement of electrodes constructed in accordance with my invention is illustrated in the accompanying drawing in which Figure 1 is a vertical sectional view of a projection arc lamp provided with coöperating electrodes constructed in accordance with my invention and Fig. 2 is an enlarged transverse sectional view of the lower electrode shown in Fig. 1, the section being taken, for example, along the line II—II of Fig. 1.

Both of the electrodes herein shown are constructed to take advantage of the fact that when an arc is formed between two electrodes, it tends to seek the hottest portions of the electrode tips, and that, if the heat developed at the end of an electrode can be localized at one definite spot, the arc will remain at that spot without the usual wandering movement. Fig. 1 of the drawing shows a positive or luminous electrode 1 coöperating with a negative or contributory electrode 2, both electrodes being supported by clamps 3 in proper focal relation to a mirror 4. Suitable adjusting and feeding mechanism is designated generally by the numeral 5 and the entire structure is shown inclosed within a housing 6. The supporting, feeding and housing structure forms no part of my present invention and may be of any well-known or desired construction.

The positive electrode 1 may be composed of any suitable electrode material and may consist, for example, of a solid rod of hard carbon through which is drilled a central longitudinal bore or perforation 7 extending from the arcing tip of the electrode to a point short of the opposite end. This perforation should be of very small diameter, a few hundredths of an inch being sufficient, and should be closed at its upper end in order that the opening may not act as a draft passage.

When an arc is drawn with an electrode having such a longitudinal bore as I have described, the arc tends to remain fixed upon a restricted area of the electrode tip including the edges of the opening, and to form a flat crater which is a very satisfactory light source. I believe that this localizing effect may be attributed to the fact that the edges of the opening are consumed somewhat more readily than the other portions of the electrode tip, and are therefore slightly hotter than the adjacent portions of the electrode. The crater thus produced is much superior in luminous efficiency to that which is obtained with an ordinary soft-cored carbon, because the dark area formed by the drilled opening is very much less than that resulting from deep burning of the core, which always occurs to a greater or less degree in soft-cored carbon electrodes. I am aware that electrodes have been made with cores, metallic insertions and other devices for localizing heat upon the electrode tip, but I believe that I am the first to accomplish this result by means of the shape of the electrode itself irrespective of the material of which it is composed.

The negative or contributory electrode 2, as shown in the drawing, comprises a shell 8 of hard carbon or any usual or desired electrode material, and a core 9 which may be composed of the same material as the shell 8 or of any other suitable material, provided that the core is not so soft as to burn deeply and thereby lose control of the arc, or so hard as to cause undue penciling or extension of the core beyond the shell as the electrode burns away. The opening which is provided in the shell 8 to receive the core 9 is made slightly larger than the core, and the space between the core and the shell is filled with a tubular partition or film 10 composed of material which is a conductor of electricity but is resistant to the passage of heat. It results from this arrangement that when the arc is struck it heats the core, which is always kept hotter than the surrounding shell because of the partial heat insulation afforded by the film 10, thereby insuring a permanent emerging point for the arc.

The heat-insulating film may be very thin, and is somewhat exaggerated in size upon the drawing for the sake of clearness. I find that a thickness of $\frac{1}{64}$ to $\frac{1}{32}$ of an inch is sufficient to produce the required arc-stabilizing effect. This film may be composed of any material having the required properties of thermal resistance and electrical conductivity and may, for example, consist of carbon having a more porous structure than the core or the shell. For this purpose, carbon dust may be mixed with water and the resulting paste used to form the film, the water being afterward driven off by baking. Another suitable material for forming the film is a mixture of water glass and carbon, which is an electrical conductor but has considerable thermal resistance, partly because of the presence of the water glass, but mainly because of the porosity of the dried mixture. Mixtures of carbon and fire clay, carbon and Portland cement and similar mixtures of finely divided conducting materials and cements may be readily devised and used for the same purpose. It is necessary that the film material shall be a conductor of electricity in order that proper electrical connection may be made between the core, the shell, and the clamps which support the electrode, and also in order that the whole electrode may act as a substantially unitary conductor. Films of clay, asbestos and the like can therefore not be used.

In order to economize shell material, the shell 2 may be covered with a coating of copper, nickel or other material of greater electrical conductivity than the shell, such coatings also serving to prevent the shell from burning away too fast on its outer surface. The quality of light produced by the electrode may be further improved by the addition to the shell, the core, or the insulating film of luminiferous materials such as barium salts, calcium salts and the like, which impart their characteristic colors to the arc.

According to a further feature of my invention, the ends of both of the electrodes 1 and 2 may be rounded during their manufacture into approximately the same shape which they assume during burning. Electrodes having the ordinary conical points must be burned for several minutes at the beginning of a trim before they become steady, because the electrode tip burns away unevenly until it acquires the normal rounded shape which approaches a paraboloid. This rounded shape is very definite and uniform in different electrodes and by grinding the ends of the electrodes into a close approximation of their ultimate burning shape, the time required for preliminary adjustment of the arc can be reduced to one minute or less. It will be evident that this saving in time is particularly important in projection apparatus for use in moving picture theaters and for like service where it is important that the arc be brought into good operating condition as rapidly as possible. A further advantage of this rounded construction is that a much smaller portion of the electrode is burned away in the preparation of a suitable point, which gives the electrode a longer life in the hands of the consumer.

The electrodes 1 and 2 work well in coöperation with each other, but either form is adapted for use with any other form of coöperating electrode. While the specific electrode structures which I have shown and described are well suited to the purposes of my present invention, it is to be understood that these structures may be variously modified and that many materials other than those which I have mentioned may be used within the scope of my invention. I therefore desire that no limitations be imposed upon my invention except such as are indicated in the appended claims.

I claim as my invention:

1. An electrode for arc lamps comprising an inner core, an outer shell, and an electrically conducting, heat-insulating partition disposed between the said core and the said shell.

2. An electrode for arc lamps comprising an inner core, an outer shell, and an electrically conducting, heat-insulating film disposed between the said core and the said shell.

3. An electrode for arc lamps comprising an inner core, an outer shell capable of burning at approximately the same rate as the said core, and an electrically conducting, heat-insulating film disposed between the said core and the said shell.

4. An electrode for arc lamps comprising an inner core, an outer shell coated with a material of greater electrical conductivity than the material composing the said shell, and an electrically conducting, heat-insulating film disposed between the said core and the said shell.

5. An electrode for arc lamps comprising an inner core of carbon, an outer core of carbon coated with metal, and an electrically conducting, heat-insulating film disposed between the said core and the said shell.

6. An electrode for arc lamps comprising an inner core, an outer shell capable of burning at approximately the same rate as the said core, the said shell being coated with a material of greater electrical conductivity than the material composing the said shell, and an electrically conducting, heat-insulating film disposed between the said core and the said shell.

7. An electrode for arc lamps comprising an inner core of carbon, an outer metal-coated shell of carbon of approximately the same hardness as the carbon composing the said core, and an electrically conducting, heat-insulating film disposed between the said core and the said shell.

8. An electrode for arc lamps comprising an inner core, an outer shell of carbon, and an intermediate film of carbon-containing material having less heat conductivity than the material composing the said core.

9. An electrode for arc lamps comprising an inner core of carbon, a metal-coated outer shell of carbon, and an intermediate film of carbon-containing material having less heat conductivity than the carbon composing the said core.

10. An electrode for arc lamps containing luminiferous material and comprising an inner core, an outer shell, and an electrically conducting, heat-insulating film disposed between the said core and the said shell.

11. An electrode for arc lamps comprising an inner core, an outer shell containing luminiferous material, and an electrically conducting, heat-insulating film disposed between the said core and the said shell.

12. An electrode for arc lamps comprising an inner core, an outer shell capable of burning at approximately the same rate as the said core and containing luminiferous material, and an electrically conducting, heat-insulating film disposed between the said core and the said shell.

13. An electrode for arc lamps containing luminiferous material and comprising an inner core, an outer shell coated with material of greater electrical conductivity than the material composing the said shell, and an electrically conducting, heat-insulating film disposed between the said core and the said shell.

14. An electrode for arc lamps containing luminiferous material and comprising an inner core, an outer metal-coated shell capable of burning at approximately the same rate as the said core, and an electrically conducting, heat-insulating film disposed between the said core and the said shell.

15. An electrode for arc lamps comprising an inner core, an outer shell containing luminiferous material, and capable of burning at approximately the same rate as the said core, a coating of metal surrounding the said shell, and an electrically conducting, heat-insulating film disposed between the said core and the said shell.

16. An electrode for arc lamps comprising an inner core of carbon, an outer shell containing carbon and luminiferous material, a coating of copper surrounding the said shell, and a film disposed between the said core and the said shell and composed of carbon-containing material of less heat conductivity than the material composing the said core.

In testimony whereof I have hereunto subscribed my name this 6th day of December, 1916.

HENRY R. EDGECOMB.